Figure 3:
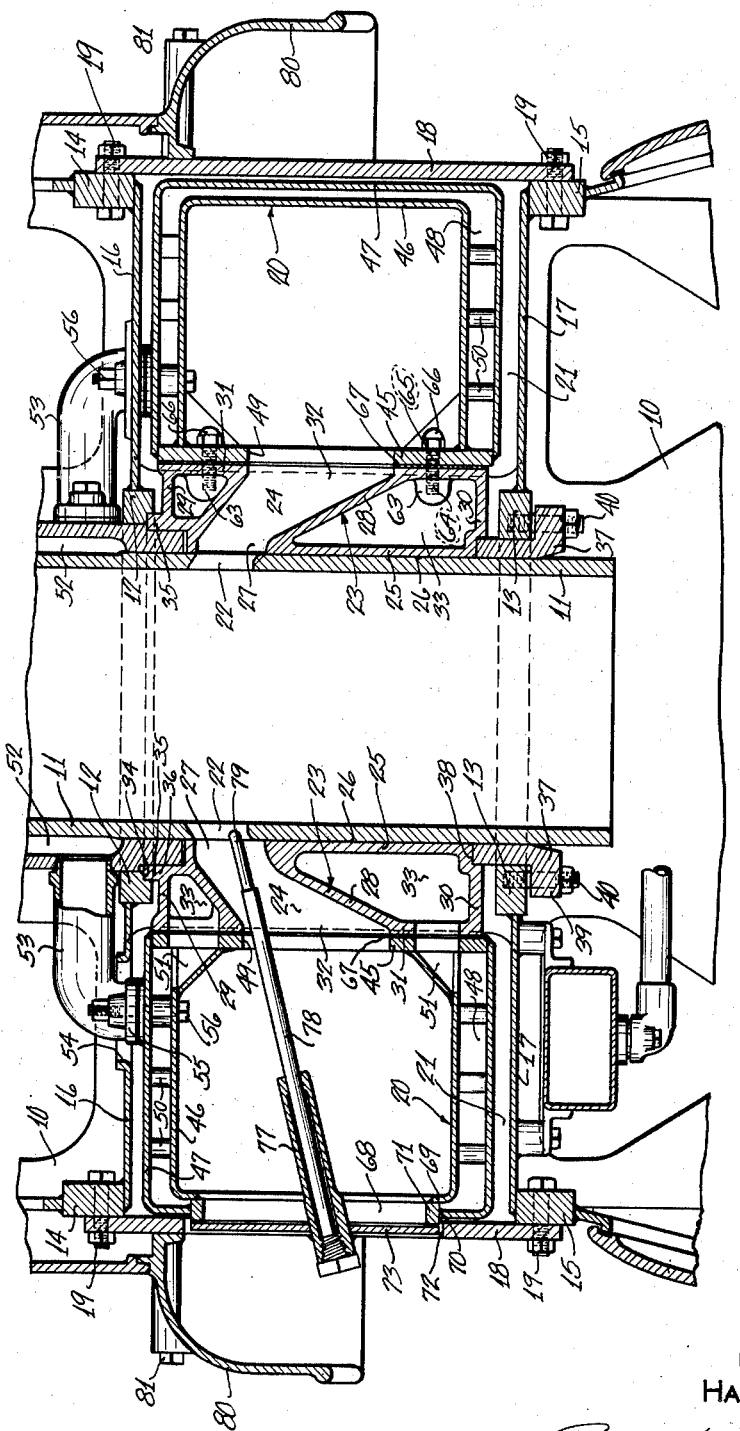

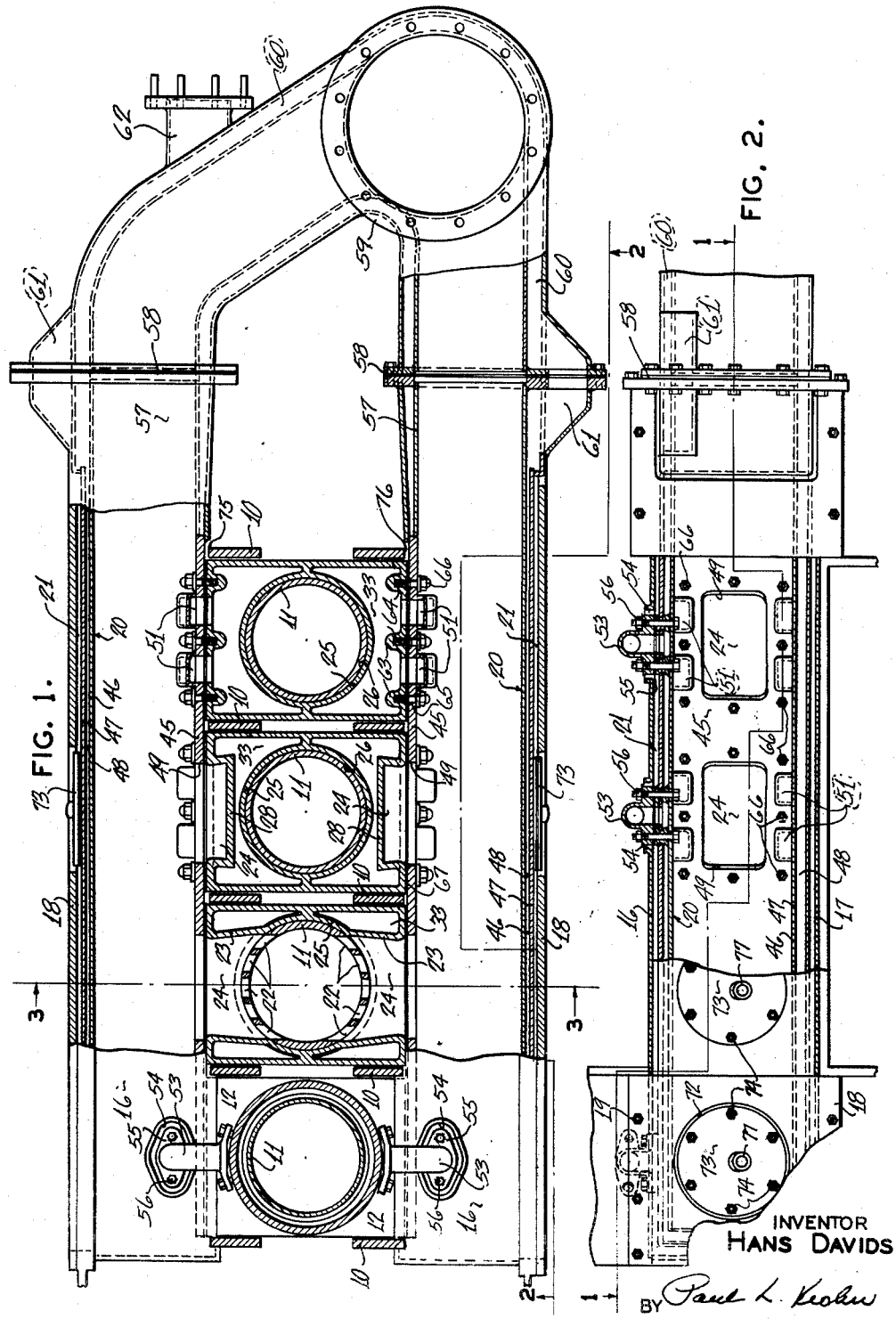

Aug. 1, 1939.                H. DAVIDS                 2,167,745
                    INTERNAL COMBUSTION ENGINE
                    Filed March 23, 1938         2 Sheets-Sheet 2

INVENTOR
HANS DAVIDS
BY
ATTORNEY

Patented Aug. 1, 1939

2,167,745

UNITED STATES PATENT OFFICE 2,167,745

INTERNAL COMBUSTION ENGINE

Hans Davids, Beloit, Wis., assignor to Fairbanks, Morse & Co., Chicago, Ill., a corporation of Illinois Application March 23, 1938, Serial No. 197,648

13 Claims. (123—195)

This invention relates to improvements in internal combustion engines, and more particularly to improvements in the structure and assembly organization of members forming an exhaust discharge system for engines of the Diesel type.

Characteristic of the internal combustion engine is the relatively high temperature of the exhaust gases discharged in operation. This factor is of importance in engine design, as a more or less direct contact of the hot, corrosive exhaust gases with portions of the engine frame and related structural elements, permitted in many prevailing exhaust discharge arrangements, frequently results in heat warping or cracking of these parts, as well as a structural weakening thereof resulting from the corrosive action of the gases. Such structural failure in many instances, necessitates disassembly of the engine to a considerable extent, in order to effect repair or replacement of the damaged frame elements. In other instances, when such damage to the engine block or frame is extensive, a complete scrapping of the engine and replacement by a new engine frequently becomes necessary as a practical measure, for economic and other reasons. It will be readily appreciated then, that an exhaust discharge arrangement which will negative or at least materially reduce warping or cracking of the engine frame as a more or less direct result of the hot exhaust gases, is greatly to be desired in modern engines, as a means for extending the usefulness and life of the engine frame. While the temperature of the exhaust gases discharged by a Diesel engine is generally somewhat lower than that of the exhaust discharged by a gasoline engine, nevertheless the factors above discussed apply to engines of the Diesel type to which this invention is primarily directed.

Accordingly, the principal purpose of the present invention is to provide in an engine of Diesel type, an improved exhaust discharge assembly which is designed to overcome in an effective manner, the above noted disadvantages, and to attain discharge of the exhaust gases without contact thereof with any part of the engine frame, the arrangement of the discharge assembly being such as to permit heat-expansion of the engine cylinder or cylinders relative thereto, in a direction both laterally and axially of the cylinder.

Another object resides in the provision of a greatly improved exhaust discharge assembly for engines of the Diesel type, which comprises separately removable and interchangeable exhaust-collector elements individual to each of the engine cylinders, each collector element being operatively associated with its cylinder in a manner to permit heat-expansion of the cylinder relative thereto, and an exhaust manifold common to all of the collector elements, the manifold and collector elements being separate from the engine frame and each removable as a unit.

A further object is to provide in combination in a Diesel engine having removable cylinder liners, an exhaust-collector member individual to each liner and peripherally engaging the same, and an exhaust manifold common to and carried by the collector members, the manifold and the collector members each being formed as a unit and related in assembly to each other and to the engine in a manner permitting ready and easy removal thereof for repair or replacement purposes, without necessitating any major disassembly of the engine structure.

A further object is to provide exhaust-collector units and one or more manifold units operatively related as described, each of which is of jacketed construction for receiving engine cooling fluid, the jacket spaces of the units being interconnected and in fluid association with the cylinder liner jackets, whereby to assist engine cooling through cooling of the exhaust gases in the units as well as cooling of the liners at the exhaust port zones; the fluid cooling system for the engine, which is comprised essentially of the jacket spaces in the cylinder liners, exhaust manifold units and the collector units, being such that the cooling fluid does not contact any part of the engine block or frame, thus preventing damage thereto by the corrosive action of the cooling fluid.

Yet another object is to provide an exhaust discharge system of the type described, including jacketed exhaust manifold and exhaust collector units in cooling fluid communication with jacket spaces in the cylinder liners, wherein the engine cooling fluid is pre-heated by passage through the jacketed manifolds and collector units before delivery thereof to the cylinder liner jackets, whereby to materially reduce heat stresses in the cylinder liners which would otherwise occur through direct delivery of the cooling fluid to the liner jackets. The foregoing provision is of particular importance when the engine is started after a relatively short shut-down period and while the cylinders are still warm.

Numerous other objects and advantages will readily appear as the description proceeds, and from the accompanying drawings, in which: Fig. 1 is a fragmentary horizontal section longitudinally through the exhaust discharge zone of an internal combustion engine, illustrating features of the invention, the section being taken from line 1—1 in Fig. 2; Fig. 2 is a fragmentary vertical section of the engine, as viewed from line 2—2 in Fig. 1, and Fig. 3 is an enlarged, fragmentary transverse section of the engine, as taken from line 3—3 in Fig. 1.

Referring now to the drawings by suitable characters of reference, the invention is preferably embodied in a multi-cylinder internal combustion engine of Diesel type, being applicable with equal facility to Diesel engines of the single piston per cylinder type, or to the opposed-piston type. In the present example, the engine disclosure is confined to the exhaust discharge zone thereof, as the remainder of the engine structure forms no part of the invention. The engine frame, which in the present example is of fabricated construction having the frame elements welded or otherwise secured together, comprises horizontally spaced, transverse plates or members 10 extending vertically of the engine. The spacing of these plates defines zones or pockets in which cylinder liners 11 are disposed (Fig. 1). The cylinder liners are vertically removable and are supported by elements of the frame not shown.

Referring to Fig. 3, which is a vertical section transversely through the engine structure and diametrically through a cylinder liner thereof, substantially at the exhaust discharge zone or belt of the engine, there are shown in section, upper and lower horizontal frame elements 12 and 13 respectively, of substantially annular or ring form, these rings serving to determine the assembly position of the cylinder liner, as will hereinafter appear. Laterally spaced from the ring 12 and from liner 11 on either side thereof are frame bars 14, while similarly located with respect to the lower ring 13 and liner, are frame bars 15. These bars serve structurally to interconnect the adjacent pair of plates 10 between which is situated the liner 11. Connecting the ring 12 and upper bar 14 on each side of the liner, is a horizontal so-called deck plate 16, while similarly connecting the lower ring 13 and lower bar 15 on each side of the liner, is a like deck plate 17. Structurally interconnecting the upper and lower bars 14 and 15 are plates 18, being secured thereto by bolts 19. These plates, which preferably extend longitudinally throughout the engine assembly, serve as exhaust zone cover plates giving access, when removed, to exhaust manifold structures 20 arranged in the spaces 21 defined by the deck plates 16 and 17. The structural features and arrangement of the manifolds will be fully described hereinafter.

Liner 11 is provided with diametrally opposed exhaust ports 22, and peripherally engaging or sleeved upon the liner at the port zone, is an exhaust collector member 23 of jacketed construction, preferably formed of cast iron. The member is provided with passages 24 which communicate with the ports 22 and with the exhaust manifolds later to be described. The member comprises an inner, substantially circular wall 25 defining an aperture 26 for the reception of the liner, the wall contacting the liner in assembly and being unbroken except for the passage ports 27 in communication with the liner ports; walls 28 defining the passages 24; upper bridging wall 29; lower bridging wall 30 and outer wall 31 provided with exhaust outlet ports 32 for passages 24. The outer wall 31 is substantially rectangular in form, as appears from the section thereof, shown in Fig. 1. The space interior of the member, formed by the walls above described, provides a chamber 33 for receiving a suitable engine cooling fluid.

It is to be noted here that the assembly relation of the exhaust collector member and cylinder liner is such that the liner has what may be termed a "close slip fit" in the aperture 26 of the collector member. This relation may be defined as a fit which is intermediate a press fit and the usual so-called "slip fit". The purpose for providing a fit as defined, is to permit heat-expansion of the liner laterally as well as axially thereof, with respect to the collector member, while attaining a sufficiently close contact between the liner and the wall 25 of the collector member as to provide for efficient heat-conduction therebeween. Thus in the latter provision, heat of combustion may be conducted without impairment of transfer, from the liner to the collector wall 25 and thence to the cooling fluid in the collector jacket space 33.

As shown by Fig. 3, the upper cylinder guide ring 12 is formed to provide an annular shouldered recess 34 on its internal, lower peripheral edge, the recess serving in the assembly of the collector member to the engine frame and liner, to receive an annular projection 35 on the upper end 36 of the exhaust collector member 23. The collector member is retained in the described assembled relation to the liner with the projection 35 thereof seated in ring recess 34, by a flanged retaining ring 37 at the lower end of the member, the ring engaging and seating in an annular recess 38 formed in the member. The ring is bolted to the lower frame ring 13 through the retaining ring flange 39 as by bolts 40 which when drawn up, serve through the ring 37 to displace the member upwardly about the liner until a firm seating of the projection 35 in the ring recess 34 is attained. The flanged ring 37 as will be observed in Fig. 3, peripherally engages the lower portion of the liner in the assembly of the parts. The ring thus serves to retain the liner against lateral displacement, and further cooperates with the upper frame ring 12 which peripherally engages the adjacent portion of the liner structure, to position both the liner and the collector member in assembly, such as to attain a close slip fit of the liner in the collector member.

It will now appear that the liner and collector member are so related in assembly as to permit heat-expansion of the liner in a direction both laterally and axially thereof, relative to the collector member. Furthermore, it will be observed that the liner may be displaced upwardly through the collector member, as for removal thereof, without disturbing the member, as the latter is held in assembly position by its projection 35 seated in the frame ring recess 34 and by the retaining ring 37.

Turning now to a description of the exhaust manifolds located on opposite sides of the engine exhaust belt or zone, but one thereof will be described in detail, as both are substantially identical in structure and arrangement. Also, the operative association of the manifold to the collector members will be described in connection with only one of such members, as the same arrangement applies to each. The manifold heretofore designated by numeral 20, is formed as a unit and is common to all of the liners and collector members 23, extending longitudinally throughout the engine. The manifold which is by preference, formed of sheet steel, is of jacketed construction and comprises a vertical wall 45 of substantial thickness, to which is connected by any suitable means, as welding, an inner U-shaped wall 46 and an outer U-shaped wall 47, the walls 46 and 47 being spaced as shown, to provide a jacket space 48 through which is circulated an engine cooling fluid. A port 49 is formed in wall 45, in register with the port 32 of the adjacent passage 24 in the collector member 23. Suitable elements or ribs 50 connecting the walls 46 and 47, may be provided to strengthen the jacketed structure of the manifold against excessive fluid pressures in the jacket space, as well as for other structural reasons. The jacket spaces 48 and 33 in the manifold and exhaust collector member 23 respectively, are in fluid communication through interconnecting passages 51, while the manifold jacket space is connected to a jacket space 52 formed in the liner structure, as through a conduit 53. It will be noted as shown at the left end of Fig. 1, and which applies to all of the cylinder liners, that the jacket space of each manifold is connected to the liner jacket through conduits such as 53. Also it will be noted that in each instance, the conduit 53 extends through an opening 54 in the upper frame deck plate 16 and is connected to the manifold through a flanged joint 55 secured by bolts 56 extending through the spaced manifold walls 46 and 47 (Fig. 3). The engine cooling fluid supply connection to the jacket system, may be made at any suitable point in the manifold structures or to one or more of the exhaust collector members; but in the present example, such is effected at a zone in the manifold discharge system later to be described.

The manifold assembly which is formed as a unit and adapted for ready removal as such, laterally of the engine frame upon first removing the frame cover plates 18, is removably connected at one end 57, as by a flanged joint 58, to an exhaust discharge conduit structure indicated generally at 59, the structure 59 serving to collect the exhaust gases from both manifolds and to discharge the same (Fig. 1). By preference, the structure 59 is of jacketed construction, provided with jacket space 60 which is connected to the jacket space of each manifold through a passage 61 formed at the juncture 58 of the manifold and structure 59. Moreover, the engine cooling fluid supply connection to the jacket system is by preference, made by a flanged fitting 62 carried by and in fluid communication with the jacket space of the structure 59, while the fluid outlet (not shown) may be effected at any convenient point in the jacket system.

The manifold unit is operatively supported by the several collector members 23 in a preferred manner, providing for ready disconnection of the manifold therefrom. That face portion of the outer wall 31 of each collector member 23 which is engaged by wall 45 of the manifold, is provided with internally projecting bosses 63 in which are securely seated, as through a threaded connection, threaded studs 64 which project laterally beyond the wall. Stud-receiving apertures 65 are formed in the thickened wall 45 of the manifold, through which the studs project. Securing nuts 66 are threaded onto the studs and when drawn up, securely attach the manifold unit to the collector members 23. A suitable gasket 67 formed of copper-asbestos or other material, may be seated between the mating walls of the manifold and collector members 23, to provide an effective gas seal for the manifold port connection 49 to the port 32 of the passage 24 in each member, as well as a water seal of the passages 51 between the jacket spaces in the collector members and the manifold.

Access to the nuts 66 and also to the bolts 56, is provided for by a hand-hole 68, opposite each of the collector members, the hand-hole being formed by aperturing the manifold walls 46 and 47, as at 69 and 70 respectively, the margins of which are bridged by a ring 71 preferably formed of steel and welded or otherwise secured thereto. The ring serves as well, to complete the closure of the jacket space at the hand-hole zone. In register with the manifold hand-hole 68 is an aperture 72 in the cover plate 18 (Figs. 1 and 3). A hand-hole closure plate 73 is provided, and is removably secured to the ring 71, as by bolts 74 (Fig. 2). A suitable gasket (not shown) may be provided at the hand-hole closure to effect a gas seal for the closure plate.

As shown by Figs. 1 and 2, each manifold unit extends longitudinally throughout the engine and between the upper and lower horizontal deck plates 16 and 17, the vertical cylinder dividing plates 19 being cut away at the exhaust belt or zone of the engine as at 75 and 76 in Fig. 1, to accommodate the manifolds. It will be observed from an inspection of the disclosure, that each manifold unit is operatively supported by the several exhaust collector members, and that no part of the manifold directly contacts any portion of the engine frame structure. Moreover, the exhaust gas discharge system comprised of the several collector members, the manifolds and structure 59, is fluid jacketed, which serves further to prevent a heat-exchange between the hot exhaust gases and any part of the engine frame. Thus the engine frame is substantially completely insulated from the heat of the exhaust gases, whereby frame warping or cracking as a result of the hot gases is substantially precluded. Also, it will be noted that the cooling fluid jacket system is such that the cooling fluid does not come into contact with any part of the engine frame, thereby preventing corrosion of the frame which would otherwise occur as a result of the corrosive action of the cooling fluid. Furthermore, it is to be observed that by reason of the circulation of cooling fluid from the source through the manifolds, the exhaust collectors and thence through the cylinder liner jackets, from which the cooling fluid is returned to the source where it is cooled for recirculation, the cooling fluid is preheated by the exhaust gases before admission to the liner jackets. Thus, heat stresses in the cylinder which would tend to occur from sudden cooling thereof as by providing a cooling fluid flow from the source directly to the cylinder jackets, is substantially eliminated.

As preferred in the present example, the closure plate 73 supports a tube or sleeve element 77 located substantially centrally thereof and extended inwardly of the manifold and at an upward inclination therein. The sleeve serves to support a pyrometer device of any suitable form, only the heat-responsive element 78 of which is illustrated, the element being of a length such that its tip portion 79 will be disposed in the collector passage 24 and in the liner exhaust port 22, in the assembly relation of the parts. The pyrometer serves through indicating means not shown, to provide an indication of the exhaust gas temperature during engine operation. A hood or shield member 80 serving to protect the outer portion (not shown) of the pyrometer, may be provided and secured, as by bolts 81, to the frame plate 18.

In the assembly of the exhaust discharge conduit elements above described, each exhaust collector element 23 is inserted laterally of the engine structure and between the deck plates 16 and 17, into liner-receiving position, this of course being done before the cylinder liner is mounted on the engine or while the liner is displaced upwardly sufficiently to clear the collector element as it is inserted. Once the collector element is properly positioned, the liner may be inserted therethrough and bolted to a portion of the engine frame (not shown). With the liner and collector element in place, the securing ring 37 is drawn up, as by the bolts 40, which securely seats the collector element against the upper ring 12 of the engine frame, in the manner heretofore described. When all of the liners and collector elements are thus assembled, the manifolds may be inserted each as a unit, laterally of the frame and between the deck plates, until the inner wall of each abuts the collector-elements and so that the studs 64 project through the stud apertures in the manifold walls 45. Applying the nuts 66 to the studs 64, the manifolds are thus securely held in assembly with the collector elements. In effecting the attachment of each manifold to the collector members, the closure plates for the hand-holes in the manifold must of course be removed, as the hand-holes provide the only access to the nuts 66 and projecting portions of the studs within the manifold. After assembly of each manifold, the hand-hole closure plates may be then assembled, with suitable gaskets, to the hand-hole rings, as heretofore indicated. At such time also the manifold jacket connections to the cylinder liner jackets may be completed, as through assembly of the conduits 53, while the connections of the manifold to the exhaust discharge structure 59 may be completed at the junctures 58 (Fig. 1).

Disassembly of the exhaust discharge elements as for repair or replacement purposes, is effected in substantially the reverse order indicated above for their assembly. But it is to be understood that before removal of the elements, the jacket connections must be broken and the jacket spaces drained of cooling fluid. Also, for the removal of any one of the exhaust collector elements, at least one of the manifold units must be first removed, as will be obvious.

Having fully described a preferred embodiment of the invention as applied by preference, to an internal combustion engine of Diesel type having removable cylinder liners, it is to be understood that the structure and arrangement of the parts comprising the invention may be altered or modified without departing from the spirit and scope of the invention, as defined by the appended claims.

I claim:

1. In combination in an internal combustion engine, an engine frame, a cylinder liner carried by said frame and provided with an exhaust port, an exhaust manifold spaced from said liner, a jacketed member formed as a separate unit, embracing said liner substantially at the zone of said port, said member being provided with a passage arranged to connect said liner port to said manifold, and means for supplying engine cooling fluid to the jacket space of said member.

2. In combination in an internal combustion engine, an engine frame, a cylinder liner carried by said frame and provided with substantially diametrally opposed exhaust ports, exhaust manifolds arranged on opposite sides of said liner, a jacketed structure embracing said liner substantially at the zone of said ports, the jacket space thereof substantially surrounding said liner exhaust port zone, said jacketed structure being provided with passages arranged to connect said ports to said manifolds, and means for supplying engine cooling fluid to the jacket space of said structure.

3. In combination in an internal combustion engine, an engine frame, a cylinder liner removably carried by said frame and provided with an exhaust port, an exhaust manifold spaced from said liner, a removable jacketed member surrounding said liner substantially at the zone of said port and engaging said manifold, the jacket space thereof being arranged substantially concentric to said liner adjacent the exhaust port zone, said member having a passage laterally therethrough, arranged to connect said port to the manifold, and means for supplying engine cooling fluid to the jacket space of said member.

4. In combination in an internal combustion engine having a removable cylinder liner provided with an exhaust port in a wall portion thereof, a jacketed member sleeved on said liner substantially at the zone of said exhaust port therein and provided with an exhaust passage in register with said port, the jacket space of said member being arranged to substantially encompass the liner at the exhaust port zone, said member having a close slip fit with said liner, means for retaining said member in assembly with the liner, and means for supplying engine cooling fluid to the jacket space in said member.

5. In combination in an internal combustion engine having a cylinder liner provided with an exhaust port in a wall portion thereof, a removable, jacketed member sleeved on said liner substantially at the zone of said port, the jacket space thereof arranged to substantially encompass the liner at the exhaust port zone, means adapted to retain said member in assembly with said liner, said member having a passage laterally therethrough and in register with said port, a jacketed exhaust manifold in communication with said passage, means providing a fluid communication between the jacket spaces in said member and manifold, and means for supplying engine cooling fluid to said jacket spaces.

6. In combination in an internal combustion engine having an engine frame and a cylinder liner removably supported thereby, said liner having an exhaust port in a wall portion thereof, said frame having an annular recess in a portion thereof, an exhaust collector element sleeved on said liner substantially at the zone of said port and provided with a passage in register with said port, said element having a portion thereof seated in said frame recess, means on said frame for releasably retaining said element in assembly with the liner and in engagement with said recess, and an exhaust conduit in communication with said passage.

7. In combination in an internal combustion engine having an engine frame and a cylinder liner removably supported thereby, said liner having an exhaust port in a wall portion thereof, an annular recess in a portion of the frame, an exhaust collector element sleeved on said liner substantially at the zone of said port and having a portion thereof seated in said recess, means carried by the engine frame for releasably retaining said element in engagement with said recess, said element having a passage therethrough in register with said port, and an exhaust conduit communicating with said passage, said conduit being supported by said collector element.

8. In combination in an internal combustion engine provided with an engine frame and a cylinder liner removably supported thereby, said liner having an exhaust port in a wall portion thereof, a jacketed, exhaust collector element sleeved on and having a close slip fit with said liner substantially at the zone of said port, a recess formed in a portion of the engine frame, engaged by said collector element, a member carried by the engine frame, adapted for retaining said element in engagement with said recess, said element having a passage therethrough in register with said port, a jacketed exhaust conduit carried by said collector element and communicating with the passage therein, the jacket spaces of said element and conduit being in fluid communication, and means for supplying engine cooling fluid to said spaces.

9. In combination in an internal combustion engine of a type including removable cylinder liners, exhaust ports in said liners, a removable exhaust collector member operatively associated with each of said liners substantially at the zone of said ports, means serving to retain said members in assembly with said liners, an exhaust manifold common to said collector members, means carried by each of said collector members projecting internally of said manifold, providing an operative support for said manifold, and normally closed apertures in the manifold, giving access to said manifold supporting means.

10. In combination in an internal combustion engine having an engine frame and a cylinder liner removably supported thereby, exhaust ports in said liner, an exhaust collector element extending about the zone of said ports, an annular recess in said frame concentric with said liner, an annular projection on said element, and a retaining ring on said frame adapted to seat said projection in said recess whereby to position said element concentrically with said liner.

11. In combination in an internal combustion engine, an engine frame and a cylinder aperture therein, a liner adapted to be inserted in said aperture, exhaust ports in said liner, an exhaust collector member extending about the zone of said ports, an annular recess in said frame concentric with said cylinder aperture, an annular projection on said member, means adapted to seat and retain said projection in said recess whereby to concentrically position said member with said aperture for peripheral engagement with said liner.

12. In combination in an internal combustion engine having an engine frame and a cylinder liner removably supported thereby, said liner having exhaust ports in a wall portion thereof, an exhaust collector element engaging said liner in the region of said ports, an exhaust passage in said element in register with said ports and with an exhaust manifold, a jacket in said element extending about said passage and about the zone of engagement of the liner and exhaust element, and means for introducing a circulated cooling fluid in said jacket for carrying away the heat transferred thereto from said exhaust passage and from the engaging portions of the liner and exhaust collector element.

13. In combination with an internal combustion engine of a type providing removable cylinder liners, exhaust ports in said liners, a removable exhaust collector member operatively associated with each liner substantially at the exhaust port zone thereof, means including cooperating elements on each liner and its associated collector member, serving to retain the member in assembly with the liner, projecting elements on each collector member, a removable manifold formed as a unit and common to all of said collector members, a wall portion of which is perforated to receive said projecting elements in the assembly of the manifold to said members, securing means engaging said projecting elements internally of the manifold, adapted to secure said manifold to said members, said means and projecting elements serving as the sole support for said manifold unit, and normally closed apertures in said manifold, providing access to said securing means within the manifold.

HANS DAVIDS.